(12) United States Patent
Fishel

(10) Patent No.: US 6,678,706 B1
(45) Date of Patent: Jan. 13, 2004

(54) HYPERTEXT MARKER AND METHOD FOR DYNAMICALLY DISPLAYING HELP INFORMATION IN AN INTERACTIVE DATA PROCESSING SYSTEM

(75) Inventor: Edward Allen Fishel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 07/687,261

(22) Filed: Apr. 18, 1991

(51) Int. Cl.[7] ............................................. G06F 17/30
(52) U.S. Cl. ...................................... 707/501; 707/526
(58) Field of Search ................................. 395/425, 155, 395/144, 145, 161, 160, 157, 158, 600; 707/500, 501, 513, 514, 515, 516, 526, 529, 530, 531

(56) References Cited

U.S. PATENT DOCUMENTS

| | | | |
|---|---|---|---|
| 4,964,077 A | | 10/1990 | Eisen et al. |
| 5,072,412 A | * | 12/1991 | Henderson et al. ..... 395/158 X |
| 5,157,768 A | * | 10/1992 | Hoeber et al. ........... 395/155 X |
| 5,204,947 A | * | 4/1993 | Bernstein et al. ....... 395/157 X |

OTHER PUBLICATIONS

Norman Delisle & Mayer Schwartz, Contexts—A Partitioning Concept For Hypertext, 4/87, pp. 168–186.*
Deskset Environment Reference Guide (Sun Micro-Systems Inc.), 1990, p. 59.*
"Through Hypertext" by Jakob Nielsen, Communication of the ACM, Mar. 1990, vol. 33, No. 3; pp. 297–310.

* cited by examiner

Primary Examiner—Cliff N. Vo
(74) Attorney, Agent, or Firm—Joan Pennington

(57) ABSTRACT

A hypertext network is provided for use in an interactive data processing system including a processor device, a memory, a user input device and a display. The hypertext network comprises a plurality of user selectable stored information modules. Each module includes a predefined descriptive header and at least some modules include a link reference phrase to another one of the plurality of user selectable modules. Responsive to a user selection entry, the associated user selectable module is displayed and a marker character is stored with each link reference phrase to the selected displayed module. The marker character is stored in an input field that is accessed by a user to select a particular link reference phrase and the reference phrase text is not defined as a user input field, so that the user cannot accidentally change the reference phrase. The stored marker characters are erased or set to blank characters when the hypertext network is exited so that all marker character input fields are blank each time access to the hypertext network is initiated.

9 Claims, 2 Drawing Sheets

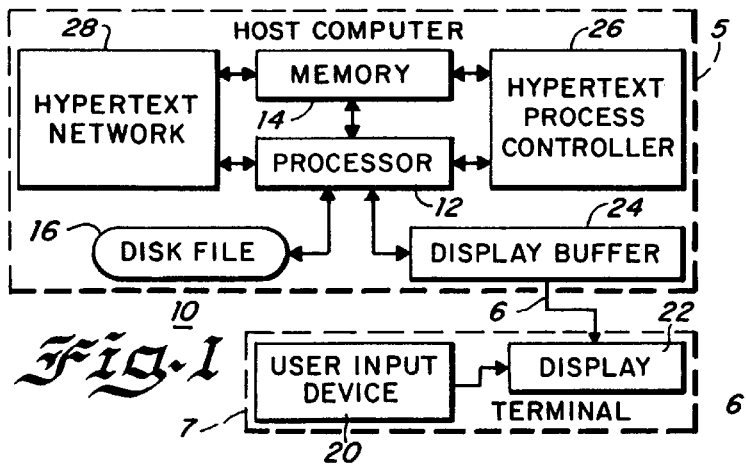
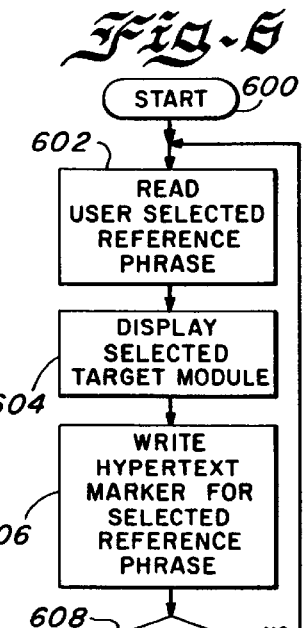
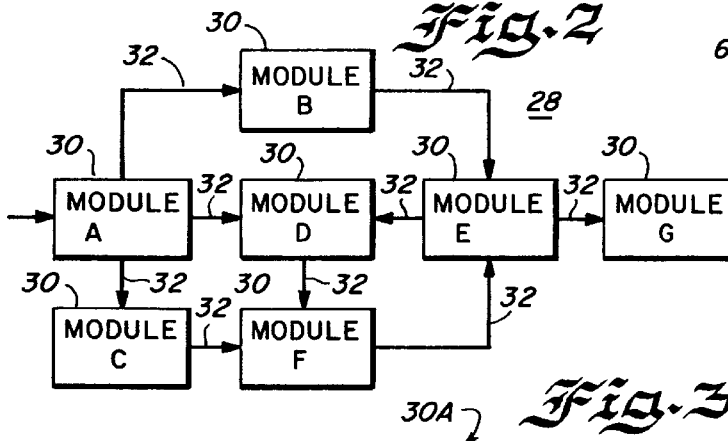

```
ASSIST              AS/400 Operational Assistant
                                       System:   RCHAS767
To select one of the following, type its number below and press Enter:

1. Work with printer output
    2. Work with jobs
    3. Work with messages
    4. Send messages
    5. ....................................................
                   36              User ID — 34
   10.  :
38 —    :  A user ID is the name by which the computer recognizes a
   75.  :  > user. Your user ID is assigned to you when you are first
          given access to the computer and is the name you use when
   80.  :  you sign on the computer.

Bottom
Type a  : F6=Viewed topics   F10=Move to top    F11=Search index
   4    : F12=Cancel         F13=User support   F24=More keys F1= Help :
```

```
ASSIST              AS/400 Operational Assistant
                                       System:   RCHAS767
To select one of the following, type its number below and press Enter:

1. Work with printer output
    2. Work with jobs
    3. Work with messages
    4. Send messages
    5. ....................................................
                   36              User — 34
   10.  :
          A user is a person who is allowed to sign on to the AS/400
   75.  :  system and make use of its resources. All users have a
38 —    —> user ID by which the computer recognizes them, as well as
   80.  :  a   user profile that contains information that controls how
38 —    :  a display appears to the users and what they are allowed to
          do on it.  36

More...
Type a  : F6=Viewed topics   F10=Move to top    F11=Search index
   4    : F12=Cancel   F13=User support   F20=Enlarge   F24=More keys F1= Help :
```

HYPERTEXT MARKER AND METHOD FOR DYNAMICALLY DISPLAYING HELP INFORMATION IN AN INTERACTIVE DATA PROCESSING SYSTEM

BACKGROUND OF THE INVENTION

1. Field of the Invention

The invention relates generally to interactive data processing systems, and more particularly to a hypertext control method and apparatus for manipulation of help information displayed in an interactive data processing system.

2. Description of the Prior Art

Computers often include online interactive learning functions to facilitate ease of learning for users of one or many computer programs or applications. Many computer systems have adopted a hypertext network or a help/dialog panel approach which gives the user display screens of help/dialog information for specific applications selected by the user. The hypertext network provides a non-sequential approach for online presentation of help information or text to describe a user selected term or concept. A choice of several options of information or text associated with particular hypertext reference phrases is provided to the user. Typically the user selects a particular hypertext screen to be displayed by selecting a hypertext reference phrase from a currently displayed hypertext screen. Then the next hypertext screen displays text associated with the selected hypertext reference phrase and additional reference phrases from which a next selection can be made.

U.S. Pat. No. 4,964,077 discloses a technique for automatically adjusting help information displayed in an online interactive data entry data processing system. The disclosed system tracks the number of times a user has invoked a help/dialog function, compares that number with a threshold value and then displays less help/dialog information to the user. The disclosed system builds a data base of help/dialogs which are uniquely addressed by the functional area and skill level of the individual user.

A problem with the conventional hypertext arrangement results from user errors in interactively entering information. For non-programmable terminals, hypertext reference phrases are defined as data entry fields. The user presses the TAB key to move the cursor to a particular displayed reference phrase and then presses the ENTER key to display the hypertext associated with the selected reference phrase. Because the hypertext reference phrase is a data entry field, it is possible for the user to modify the hypertext reference phrase by keying over the hypertext reference phrase. Also the hypertext reference phrase can be inadvertently erased completely by the user pressing a field EXIT key. As a result of such user entry errors, the hypertext network may be difficult or impossible to use.

A difficulty for the user with the conventional hypertext arrangement is navigating the hypertext network. The user may waste time by returning to previously accessed screens, instead of efficiently moving to desired information. After the user selects one or more hypertext screens, the user can lose a sense of current position or context within the hypertext network. This difficulty is sometimes called "lost in hyperspace." The lost in hyperspace effect can occur because of the size of the hypertext network, because multiple paths exist to the same hypertext screen and because paths exist which are loops.

"Through Hypertext" by Jakob Nielsen, Communication of the ACM, March 1990, Volume 33, Number 3; pages 297–310, describes a hypertext system that includes a timestamp feature for user movements between screens, so that the system displays the time which has passed since that user's previous visit to that location. Also described for use in a graphical or programmable work station are checkmarks provided and overview diagrams for indicating where the user has been and provided with hypertext anchors which the user has actually activated. The checkmarks are maintained and allowed to change color-intensity or gradually decay over time. While providing improved navigational features for programmable work stations, the disclosed arrangements do not work for non-programmable displays of host dependent terminals. Other disadvantages of the disclosed arrangements are that the checkmarks from prior sessions are displayed when a hypertext session is initiated; and that the checkmarks are not displayed with many hypertext screens.

SUMMARY OF THE INVENTION

Important objects of the present invention are to provide a hypertext control method and apparatus for dynamically displaying help information in an interactive data processing system overcoming disadvantages of hypertext networks and help/dialog arrangements used in the past; to provide a hypertext control method and apparatus in which a hypertext marker field and method for dynamically displaying a hypertext marker enables the user to effectively and efficiently access user selected help information; and to provide an improved user interface and hypertext network to facilitate ease of learning and to avoid data entry errors.

In brief, the objects and advantages of the present invention are achieved by a hypertext network for use in an interactive data processing system including a processor device, a memory, a user input device and a display. The hypertext network comprises a plurality of user selectable stored information modules. Each module includes a predefined descriptive header and at least some modules include one link reference phrase to another one of the plurality of user selectable modules. Responsive to a user selection entry, the associated user selectable module is displayed and a marker character is stored with each link reference phrase to the selected displayed module.

In accordance with features of the invention, the marker character is stored in an input field that is accessed by a user to select a particular link reference phrase and the reference phrase text is not defined as a user input field, so that the user cannot accidentally change the reference phrase. The stored marker characters are erased or set to a blank character when the hypertext network is exited so that all marker character input fields are blank each time access to the hypertext network is initiated.

BRIEF DESCRIPTION OF THE DRAWING

The present invention together with the above and other objects and advantages may best be understood from the following detailed description of the embodiment of the invention illustrated in the drawings, wherein:

FIG. 1 is a block diagram representation of a computer or data processing system used with a hypertext control method of the present invention;

FIG. 2 is a truncated block diagram illustrating a hypertext network of FIG. 1;

FIGS. 3, 4 and 5 are illustrations of hypertext screens together illustrating the operation of the present invention; and FIG. 6 is a logic flow diagram illustrating the hypertext control method and apparatus of the present invention.

DETAILED DESCRIPTION OF THE PREFERRED EMBODIMENT

FIG. 1 shows a block diagram of computer system 10 of the invention. Computer system 10 consists of host computer 5 and terminal 7. Host computer 5 contains processor 12 connected to memory 14, hypertext network 28, hypertext process controller 26, disk file 16, and display buffer 24. Display buffer 24 is connected via line 6 to display 22 of terminal 7. User input device 20 is connected to display 22. In the preferred embodiment, host computer 5 is an IBM Application System/400 Midrange computer, terminal 7 is an IBM 5250 non-programmable display terminal, display buffer 24 is a IBM Workstation I/O Processor, Type 6040, and hypertext process controller 26 is the user interface management (UIM) support facility of the AS/400.

In an alternate embodiment, computer system 10 is an IBM PS/2 computer. In this alternate embodiment, both host computer 5 and terminal 7 may be contained in the same physical package. Other alternate embodiments are possible and fall within the spirit and scope of the invention.

In FIG. 2 there is shown a truncated block diagram illustrating the hypertext network 28 including a plurality of help modules A–G designated as 30 stored on a data storage medium. Each help module 30 serves as a node in the hypertext network 28. A plurality of arrows 32 represent predefined user selectable hypertext links to other target modules or nodes 30 selected by a user to access a particular MODULE A–G of the help modules 30 of the hypertext network 28. As shown in FIG. 2, hypertext links 32 exist from MODULE A to MODULE B to MODULE E to MODULE D to MODULE F to MODULE E. Similarly, hypertext links 32 provide a path from MODULE A to MODULE C to MODULE F to MODULE E. Various paths and loops can be taken with different ones of modules 30 accessed to move between the MODULES A–G.

In accordance with the present invention, after a particular module 30 is displayed, a predefined marker character, such as, a greater than character > is stored in a marker field with each link hypertext reference phrase to the displayed module. Initially when the hypertext network 28 is accessed, all the marker fields are blank. Then for example, after the user has accessed MODULE D, the hypertext marker field for the link reference phrase to MODULE D in MODULE A and MODULE E are set or stored with the marker character >; while the marker field to the link reference phrase to MODULE G is blank until MODULE G has been viewed. Displaying the marker character > with link hypertext reference phrases to target modules provides an indication for the user of previously viewed modules to facilitate efficiently moving through multiple possible paths of the hypertext network 28. The stored marker characters > are erased at the completion of a help/dialog session when the hypertext network is exited.

Referring to FIGS. 3–5, hypertext screens for help modules 30A and 30B are shown to illustrate the hypertext marker feature and hypertext dynamic display control procedure of the invention. Each help module 30 is a variable length information record including a predefined descriptive header or title 34, such as USER shown in FIG. 3 and at least one highlighted user selectable hypertext link or link reference phrase 36, used to access other target modules 30. A one character input field 38 provided in front of each link reference phrase 36 is used for storing the marker character > after the associated hypertext module 30 has been displayed. The user presses the TAB key to move the cursor to marker field for a particular link reference phrase 36 and then presses the ENTER key to display the hypertext module associated with the selected link reference phrase. The marker input fields before the reference phrase links 36 of USER ID and USER PROFILE are set to blank because the help text modules 30 that are the targets of those links have not been seen by the user.

FIG. 4 illustrates a screen displayed for help module 30B having a header reference phrase 34 of USER ID. Moving to the screen display illustrated in FIG. 4 can be accomplished by using the TAB key to move the cursor to the marker field for USER ID in the USER module screen display of FIG. 3, then the ENTER key is pressed. In the USER ID screen of FIG. 4, the marker field is set to a > with the reference phrase link USER because the user has already viewed the USER module screen display 30A of FIG. 3.

FIG. 5 illustrates the USER module screen display 30A of FIG. 3 after viewing the USER ID module screen display, so that the screen is the same as in FIG. 3 except the marker field is set to a > with the reference phrase link USER ID.

In FIG. 6 there is shown a logic flow diagram illustrating the hypertext control method. The sequential operations begin as indicated at a block 600 with accessing the hypertext network 28. As indicated at a block 602, a user selected marker field of a selected link reference phrase is read. Then the target module 30 associated with the selected reference phrase is displayed as indicated at a block 604. The marker character > is stored or set for the marker field 38 of the selected link reference phrase for all modules 30 having a link reference phrase to the displayed module as indicated at block 606. Unless the hypertext network 28 is exited as indicated at a decision block 608, the sequential operations return for reading a next user selected marker field of a next selected reference phrase at the block 602. Otherwise, when the hypertext network 28 is exited at the block 608, then the hypertext markers > are erased with the input marker fields 38 set to blank as indicated at a block 610.

What is claimed and desired to be secured by Letters Patent of the United States is:

1. A hypertext network for use in an interactive data processing system including a processor device, a memory, a user input device and a display comprising:

means for storing a plurality of user selectable information modules, each module including a predefined descriptive header and at least some modules including a link reference phrase to another one of said plurality of user selectable modules; each link reference phrase including a marker character input field;

means responsive to a user access to the hypertext network for setting said marker character input field to a blank;

means responsive to a user selection entry for displaying an associated user selectable information module; and means responsive to displaying said selected information module for storing a marker character with each link reference phrase to said selected information module.

2. A hypertext network as recited in claim 1 wherein said marker character input field is included before a reference phrase text and the reference phrase text is not defined as a data input field.

3. A hypertext network as recited in claim 2 wherein said marker character is stored in said marker character input field.

4. A hypertext network as recited in claim 1 wherein said means responsive to a user selection entry for displaying an associated user selectable module includes means for selectively displaying a blank character or a marker character with each link reference phrase included in said associated user selectable module.

5. A hypertext network as recited in claim 2 wherein said marker character input field is set to a blank character when the hypertext network is exited.

6. A method for dynamically displaying user selectable hypertext modules of a hypertext network in an interactive data processing system, the hypertext network including a plurality of stored information modules, each module includes a predefined descriptive header and at least some of the modules include a highlighted link reference phrase to another one of said plurality of stored information modules, said method comprising the steps of:

detecting a user input entry for selecting a stored information module;

displaying the selected module responsive to said detected user input entry;

storing a marker character in a predefined input field of each link reference phrase to the displayed modules; and storing a blank character in each predefined input field of each link reference phrase responsive to a user exiting the hypertext network.

7. A method for dynamically displaying hypertext modules as recited in claim 6 wherein the step of displaying the selected module includes the step displaying a predefined marker character with each link reference phrase for previously displayed modules.

8. A method for dynamically displaying hypertext modules as recited in claim 6 further comprising the step of maintaining each said stored marker character throughout a complete session of the hypertext network.

9. An interactive data processing system comprising:

a processor device;

a user input device coupled to said processor device for user selection input;

a memory for storing a hypertext network having a plurality of information modules, each module including a predefined descriptive header and at least some modules including a link reference phrase to another one of said plurality of stored information modules; each link reference phrase including a marker character input field;

a display coupled to said processor device for displaying one of said plurality of stored information modules responsive to a user selection input;

means responsive to displaying said selected module for storing a marker character in said marker character input field of each link reference phrase to said selected displayed module; and means responsive to a user access to the hypertext network for setting said marker character input field to blank.

* * * * *